United States Patent [19]

Kaasila

[11] Patent Number: 5,489,920
[45] Date of Patent: Feb. 6, 1996

[54] METHOD FOR DETERMINING THE OPTIMUM ANGLE FOR DISPLAYING A LINE ON RASTER OUTPUT DEVICES

[75] Inventor: Sampo Kaasila, Plaistow, N.H.

[73] Assignee: Apple Computer, Inc., Cupertino, Calif.

[21] Appl. No.: 67,336

[22] Filed: May 25, 1993

Related U.S. Application Data

[63] Continuation of Ser. No. 831,622, Feb. 6, 1992, abandoned, which is a continuation of Ser. No. 421,828, Oct. 16, 1989, abandoned.

[51] Int. Cl.⁶ .................................................. G09G 5/36
[52] U.S. Cl. .............................................. 345/136; 345/142
[58] Field of Search ............................... 340/747, 748, 340/751, 728, 735, 739, 744, 727, 730, 790, 731, 799, 750; 345/136, 137, 138, 133, 142, 141, 144, 185, 192, 194, 195

[56] References Cited

U.S. PATENT DOCUMENTS

| | | | |
|---|---|---|---|
| 4,330,834 | 5/1982 | Murphy | 340/739 |
| 4,553,214 | 11/1985 | Dettmer | 340/739 |
| 4,672,370 | 6/1987 | Yu | 340/739 |
| 4,780,711 | 10/1988 | Doumas | 340/747 |
| 4,888,584 | 12/1989 | Ando et al. | 340/747 |
| 4,903,216 | 2/1990 | Huss et al. | 340/747 |

*Primary Examiner*—Richard Hjerpe
*Assistant Examiner*—Xiao M. Wu
*Attorney, Agent, or Firm*—Blakely, Sokoloff, Taylor & Zafman

[57] ABSTRACT

The present invention is a method for determining the optimum angle for displaying a line on raster output devices. The preferred embodiment defines the possible adjustments of a line as it is being displayed at a raster resolution as a penalty which comprises of a weighted sum of a distance variable and an angular variable. The weight permits the user to decide between a trade-off between the fidelity to original angle and the quality of a line being displayed. To determine the optimum angle for displaying a line at a particular raster resolution, the present invention finds the angle with the smallest penalty. The optimum angle is further constrained by a plurality of variables set by the user. Once the user provides the constraints on the minimum penalty, the present invention automatically determines the optimum angle for displaying a line on a raster output devices.

46 Claims, 11 Drawing Sheets

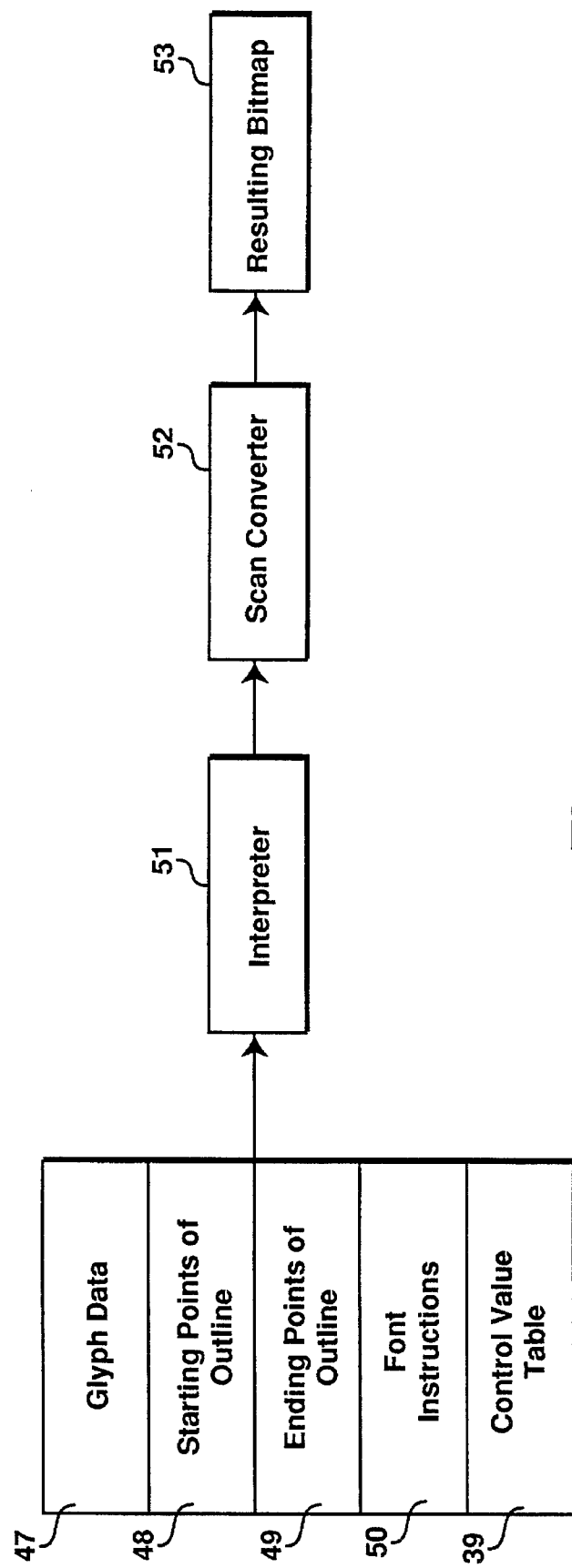

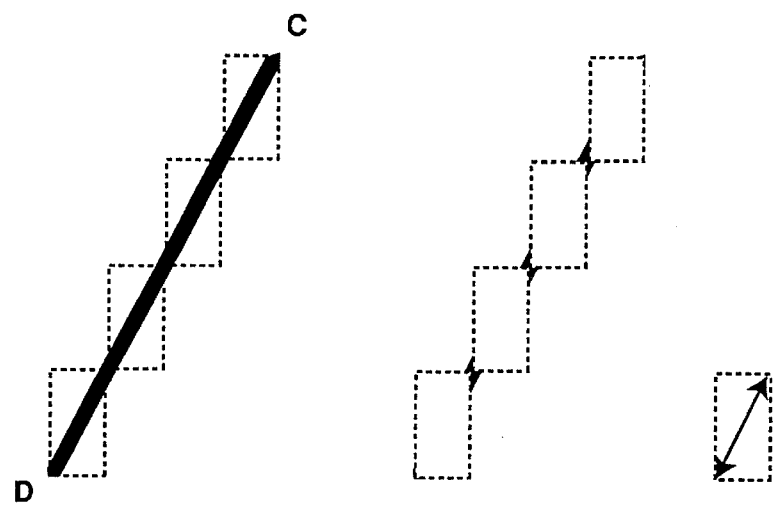
Fig. 6a    Fig. 6b    Fig. 6c
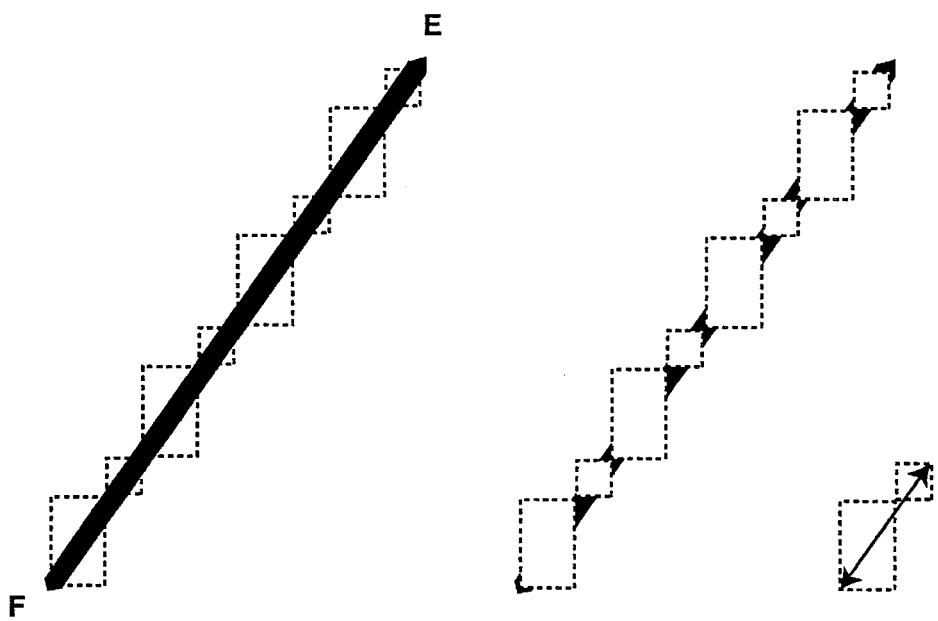
Fig. 7a    Fig. 7b    Fig. 7c
Fig. 8a    Fig. 8b    Fig. 8c $$r^2 = HI^2 = HJ^2 + IJ^2 \quad\text{———} 54$$

$$\vec{I} = \overline{HG} \times \vec{u} \quad\text{———} 55$$

| i | β | r | Uy | Ux |
|---|---|---|---|---|
| 0 | 0.0 | 1.00 | 1.00 | 0.00 |
| 1 | 45.00 | 1.41 | 0.70 | -0.70 |
| 2 | 26.56 | 2.23 | 0.89 | -0.44 |
| 3 | 18.43 | 3.16 | 0.94 | -0.31 |
| 4 | 33.69 | 3.60 | 0.83 | -0.55 |
| 5 | 14.03 | 4.12 | 0.97 | -0.24 |
| 6 | 36.86 | 5.00 | 0.80 | -0.60 |
| 7 | 11.30 | 5.09 | 0.98 | -0.19 |
| 8 | 21.80 | 5.38 | 0.92 | -0.37 |
| 9 | 30.96 | 5.83 | 0.85 | -0.51 |
| 10 | 9.46 | 6.08 | 0.98 | -0.16 |
| 11 | 38.65 | 6.40 | 0.78 | -0.62 |
| 12 | 8.13 | 7.07 | 0.98 | -0.14 |
| 13 | 15.94 | 7.28 | 0.96 | -0.27 |
| 14 | 23.19 | 7.61 | 0.91 | -0.39 |
| 15 | 39.80 | 7.81 | 0.76 | -0.64 |
| 16 | 29.74 | 8.06 | 0.86 | -0.49 |
| 17 | 7.12 | 8.06 | 0.99 | -0.12 |
| 18 | 20.55 | 8.54 | 0.93 | -0.35 |
| 19 | 35.35 | 8.60 | 0.81 | -0.58 |

Fig. 11

METHOD FOR DETERMINING THE OPTIMUM ANGLE FOR DISPLAYING A LINE ON RASTER OUTPUT DEVICES

This is a continuation of application Ser. No. 07/831,622, filed Feb. 6, 1992, which is a continuation of application Ser. No. 07/421,828, filed Oct. 16, 1989, now both abandoned.

BACKGROUND OF THE INVENTION

1. Field of the Invention

The present invention relates to the field of digital typography. In particular, the present invention provides a method for determining the optimum angle for displaying a line on raster output devices.

2. Background of Prior Art

Existing digital font-rendering techniques on computers can be classified into three categories: (1) bitmap type, (2) algorithmic type, and (3) outline type.

Bitmap rendering techniques are the most direct way to display fonts as ultimately all fonts must be realized as bitmaps in the raster output devices such as printer or CRT. Here, fonts are described and manipulated as explicit bitmaps. However, such techniques consume a sizable amount of the computer's memory. (For example, see U.S. Pat. No. 4,029,947). Given the large variety of typefaces, selection of point sizes, and infinite choice of resolutions, bitmap rendering techniques are awkward to store and manipulate. Morever, fonts created by bitmap rendering techniques are visually satisfactory at the specific sizes at which they are installed in the systems. To obtain a font at sizes matching the raster output devices, one has to scale the font from the installed size to that of the desired size. The resulting output is unpredictable and usually appears visually "lumpy."

Algorithmic rendering techniques describe and specify typefaces with algorithmic programs. Such programs could be parametric, enabling font designers and developers to change a design via parameters each time the program is executed.

Outline rendering techniques describe and manipulate typefaces as outlines. A compact representation of font results from the use of splines to record and regenerate the shape of curves. Splines are curves that are controlled by a small set of given control points and tangents. Some manufacturers of outline fonts in the world use a system based on the principles of IKARUS. See Peter Karow, *Digital Formats for Typefaces*, (URW Verlag, 1987). Outline font-rendering techniques create outlines from digitized input of typefaces and convert outlines automatically to equivalent bitmap forms for output to raster output device, such as a printer or CRT. Representing idealized design by outlines not only obviates large memory storage but also permits interactive editing by the font designer.

Nevertheless, outlines do not render perfect characters at all sizes. Most outline font renderers are based on data structures which assume pre-defined steps in controlling outlines. A few outline font formats have primitives. Primitives are basic methods to control outlines, such as correcting the height of typefaces. The smaller number of pixels at low raster resolution makes it difficult to match fonts of different size and resolution. It should be noted that most of the raster output devices in current use, such as CRT and draft printers, are of the low raster resolution category. As such, it is important to improve the resulting bitmap of typefaces at low raster resolution.

One of the more difficult designing decisions under the outline rendering techniques is how to adjust the angle of a line in displaying at lower raster output devices. The decision for lines positioned vertically (90 degrees), horizontally (0 or 180 degrees), or even at (45 degrees) usually does not require much adjustments. However, for a character that has a line, such as a divide sign "/", or italic characters "A", or any glyph with a straight edge portion, the decision can be a difficult one as there are infinite angles between the above three given angles. It is, therefore, an objective of the present invention to provide a method of determining the optimum angle for displaying a line on raster output devices.

SUMMARY OF THE INVENTION

The present invention provides a method which is most advantageously used in conjunction with a digital computer for improving font rendering capability. This technique permits font rendering engines to improve font display at low raster resolution. A font is a collection of glyphs which generally have some element of consistency in their appearance (e.g. serifs, or stroke thickness). A glyph is a graphical depiction which usually represents a character, symbol, or other textual object. An outline font is a compact way to represent glyphs on digital computer by creating outlines from control points on the glyphs.

In accordance with the preferred embodiment of the present invention, there is provided a means for accepting an input representation of outlines of a font, which may be comprised of alphanumericals, non-Roman based characters, or any arbitrary symbols. This input representation is most advantageously coupled to a digital computer. Once received, a control program within the computer memory displays the outlines on an appropriate device, such as a CRT, of the selected glyph. Font instructions incorporating scaling, interpolating, and grid-fitting techniques are available for a user to produce outlines of typefaces at various sizes and resolutions. Grid-fitting is the alignment of control points in a digital outline description to a grid and other manipulation of the position of control points for the purpose of facilitating scan conversion outputs.

Because outlines do not create perfect characters at all sizes (particularly smaller sizes), font rendering engines are restricted in their ability to enhance the resulting bitmap at low raster resolution.

An outline manipulation means is disclosed in the present invention for determining the optimum angle for displaying a line raster output devices. The preferred embodiment defines the possible adjustments of a line as it is being displayed at a raster resolution as a penalty which comprises of a distance variable and a weighted angular variable. The weight associated with the angular variable permits the user to decide between a trade-off between the speed and the quality of a line being displayed. To determine the optimum angle for displaying the line at a raster resolution, the present invention finds the angle with the smallest penalty. The optimum angle is further constrained by a plurality of variables set by the user. Once the user provides the constraints on the minimum penalty, the present invention automatically determines the optimum angle for displaying a line for a raster output devices.

BRIEF DESCRIPTION OF THE DRAWINGS

FIG. 5 illustrates a flow chart of the process of converting B-spline font data into digital typeface through a interpreter and scan converter.

FIG. 6a shows the outlines of a horizontal line AB being displayed at a low raster resolution.

FIG. 6b shows the resulting bitmap of a line AB displayed at a low raster resolution.

FIG. 6c is a pixel pattern repeated horizontally to produce the resulting bitmap for the line AB.

FIG. 7a shows the outlines of a line CD being displayed at a low raster resolution.

FIG. 7b shows the resulting bitmap of a line CD displayed at a low raster resolution.

FIG. 7c is a pixel pattern repeated linearly to produce the resulting bitmap for the line CD.

FIG. 8a shows the outlines of a line EF being displayed at a low raster resolution with its resulting bitmap superimposed thereon and defining another pixel repetition period.

FIG. 8b shows the resulting bitmap of a line EF displayed at a low raster resolution.

FIG. 8c is a pixel pattern repeated linearly to produce the resulting bitmap for the line EF.

FIG. 11 is a table of optimum angles and shortest pixel repetition period for determining the optimum angle for displaying a line on raster output devices.

NOTATION AND NONMENCLATURE

Figure 1:
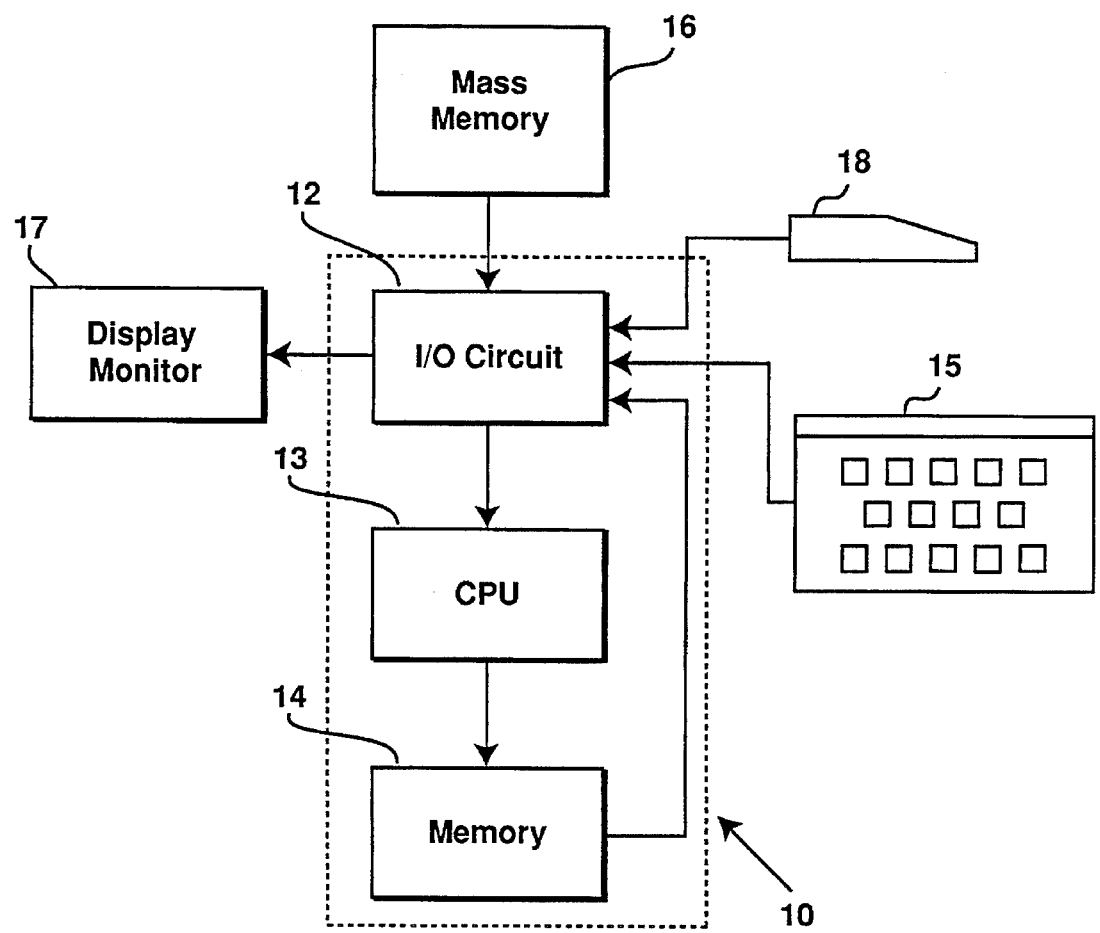
FIG. 1 illustrates a computer incorporating the preferred embodiment of the present invention.

The detailed description which follows is presented largely in terms of algorithms and symbolic representations of operations on data bits and data structures within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulation of physical quantities. Usually, though necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulation performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE INVENTION

The following detailed description will be divided into several sections. The first of these will treat a general system arrangement for generating computer digital fonts. Subsequent sections will deal with the process of creating outlines of a glyph, specifying a size and a resolution the glyph would be displayed. By way of background information, the preceding sections are substantially similar to the applicant's other U.S. patent applications Ser. No. 07348,703 and Ser. No. 07 348,806, filed May 9, 1989. An angle optimizing instruction is provided to improve the resulting bitmap of a line or portions of a glyph with straight edges.

In addition, in the following description, numerous specific details are set forth such as algorithmic convention, specific numbers of bits, etc., in order to provide a thorough understanding of the present invention. However, it will be obvious to one skilled in the art that the present invention may be practiced without these specific details. In other instances, well-known circuits and structures are not described in detail in order not to obscure the present invention unnecessarily.

GENERAL SYSTEM CONFIGURATION

FIG. 1 shows a typical computer-based system for generating computer graphic images according to the present invention. Shown there is a computer 10 which comprises three major components. The first of these is the input/output (I/O) circuit 12 which is used to communicate information in appropriately structured form to and form the other parts of computer 10. Also shown as part of computer 10 is the central processing unit (CPU) 13 and memory 14. These latter two elements are those typically found in most general purpose computers and almost all special purpose computers. In fact, the several elements contained within computer 10 are intended to be representative of this broad category of data processors to fill the role of computer 10 included machines manufactured by the Apple Computer, Inc. . . . , Cupertino, Calif. Other computers having like capabilities may of course be adapted in a straightforward manner to perform the several functions described below.

Also shown in FIG. 1 is an input device 15, shown in typical embodiment as a keyboard. It should be understood, however, that the input device may actually be a card reader, magnetic or paper tape reader, or other well-known input device (including, of course, another computer). A mass memory device 16 is coupled to the I/O circuit 12 and provides additional storage capability for the computer 10. The mass memory may include other programs, fonts for given characters, and the like and may take take the form of a magnetic or paper tape reader or other well known device. It will be appreciated that the data retained within mass memory 16, may, in appropriate cases, be incorporated in standard fashion into computer 10 as part of memory 14.

In addition, a display monitor 17 is illustrated which is used to display the images being generated by the present invention. Such a display monitor may take the form of any of several varieties of CRT displays. A cursor control 18 is used to select command modes and edit graphic data, such as for example a particular image, and provides a more convenient means to input information into the system.

Figure 2:
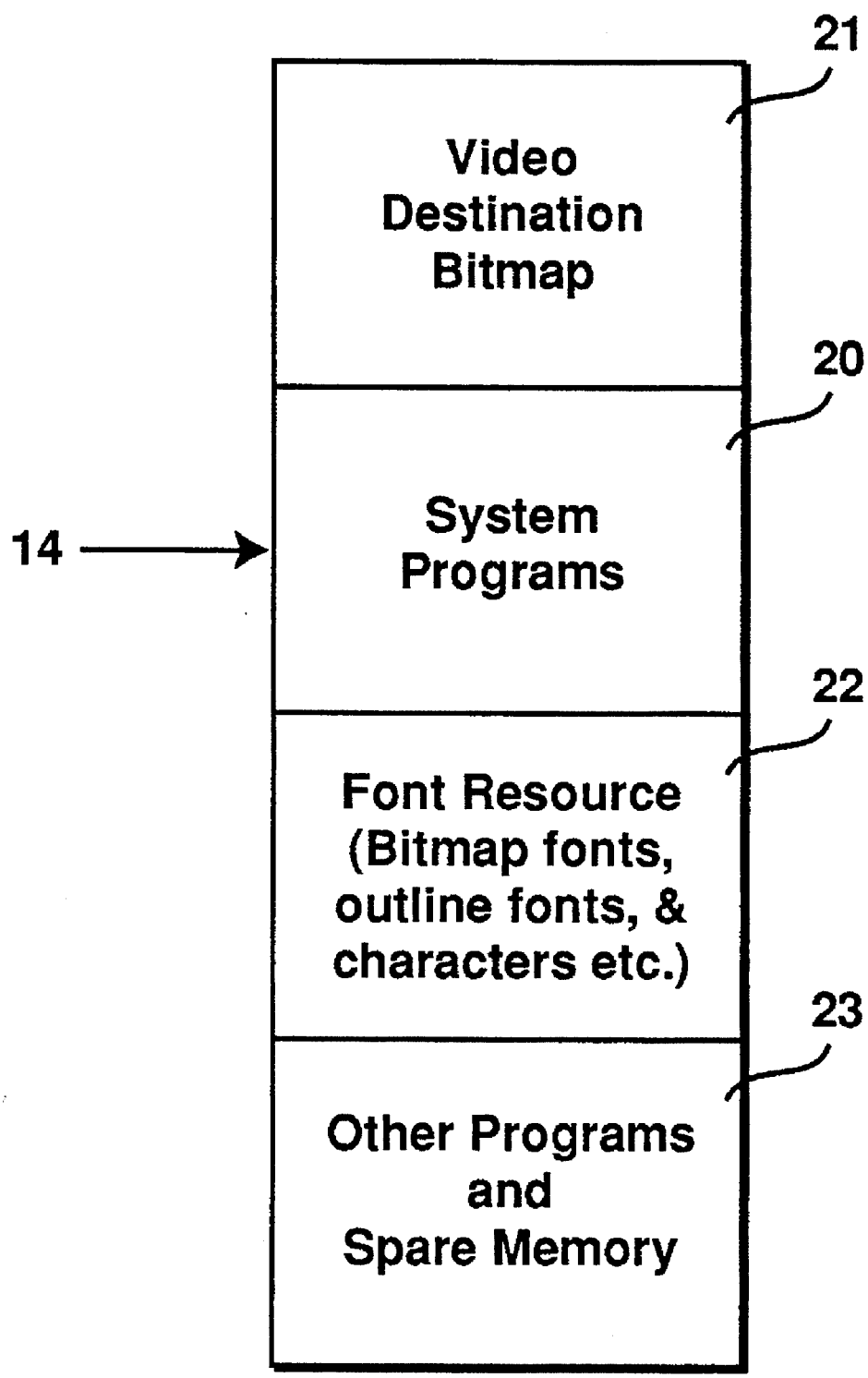
FIG. 2 shows a typical arrangement of program storage in the system of FIG. 1.

FIG. 2 shows a typical arrangement of the major programs contained within the memory 14 illustrated in FIG. 1. In particular, there is shown a video destination bitmap 21. This destination bitmap represents the video memory for the display monitor 17. Each bit in the destination bitmap corresponds to the upper left coordinate of a corresponding pixel on the display monitor. Thus, the destination bitmap can be described as a two-dimensional array of points having known coordinates. Of course, in the present case, where the display monitor is used in conjunction with a low raster output device such as a printer, the contents of the bitmap.21 would be the resulting bitmap and represent the data points to be displayed by the particular low resolution raster output device.

Memory 14 also include system program 20 which represent a variety of sequences of instructions for execution by the CPU. For example, the control programs such as the interpreter, scan converter, disk operating systems and the like may be stored within this memory location.

Font resource 22 contains bitmap fonts, outline fonts, coordinates and characters in memory 14 or may be stored temporarily in mass memory 16 as may be required in any given application of the present invention. Additionally, space within memory 14 is reserved for other programs and spare memory which is designated at 23. These other programs may include a variety of useful computational or utility programs as may be desired.

PROCESS OVERVIEW

The process of the present invention will be best understood in reference to the steps a font designer would go through in creating an outline font, in scaling a glyph to a smaller size, and in grid-fitting the outlines at low raster resolution.

Below are some units of measurement commonly used in the field of digital typography that are helpful in relating quantity and quality expressed herein. The size of a type is measured in points. An inch has about 72 points. The resolution of an raster output device is expressed in dots per inch (dpi). Laser printers typically have a resolution of 240 to 400 dpi, while CRTs have a resolution of 50 to 200 dpi. To express a size of a type to be displayed in a particular raster output resolution, one uses Pixel per em (ppem). It is the product of size and resolution divided by the number of points in an inch.

Figure 3A:
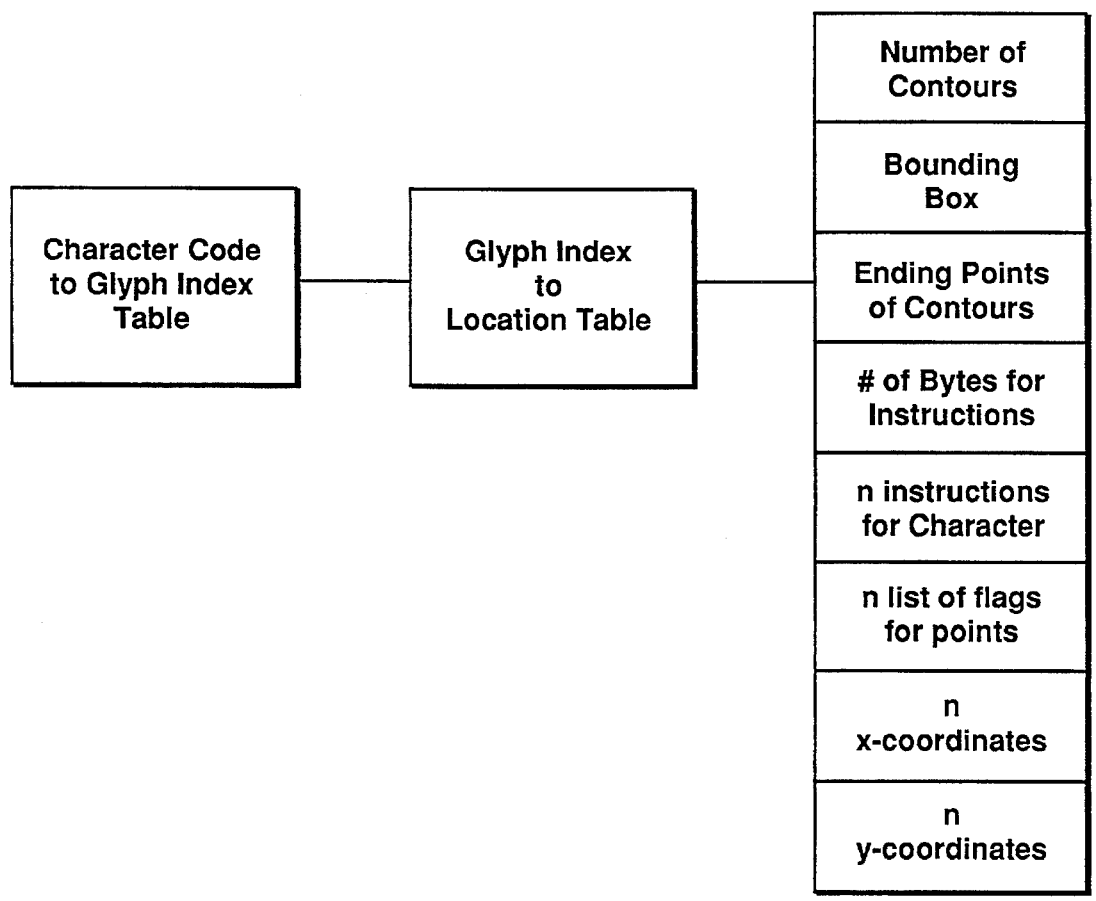
FIG. 3a illustrates a typical B-spline outline data structure for storing a glyph.

In FIG. 2, Font resource 22 consists of a data structure which houses the actual outline fonts along with bitmap fonts and other standard character sets. A font designer would build an outline font by first describing and storing a glyph in an outline or spline format. 2nd order B-splines are an important class of splines because they provide good approximation to letterforms, are relatively fast computationally, and offer users control of both on-curve and off-curve control points. To specify the outlines of a glyph using 2nd order B-spline, one has to supply: (i) the number of outlines, (ii) last point of every contour, and (iii) a flag indicating if a control point is on or off the outline. Thus glyph are specified in the following format as provided by FIG. 3*a*:

| Field | Bytes | Sign | Description |
|---|---|---|---|
|  | 2 | Unsigned | Number of outlines |
|  | 8 | Signed | Bounding box: x-min y-min; x-max; & y-max |
|  | n | Unsigned | Endings points of outlines |
|  | 2 | Unsigned | # of bytes used for instructions |
|  | n | Unsigned | instruction for glyph |
|  | n | Unsigned | list of flags for points |
|  | n | Unsigned | x-coordinates |
|  | n | Unsigned | y-coordinates |

Figure 3B:
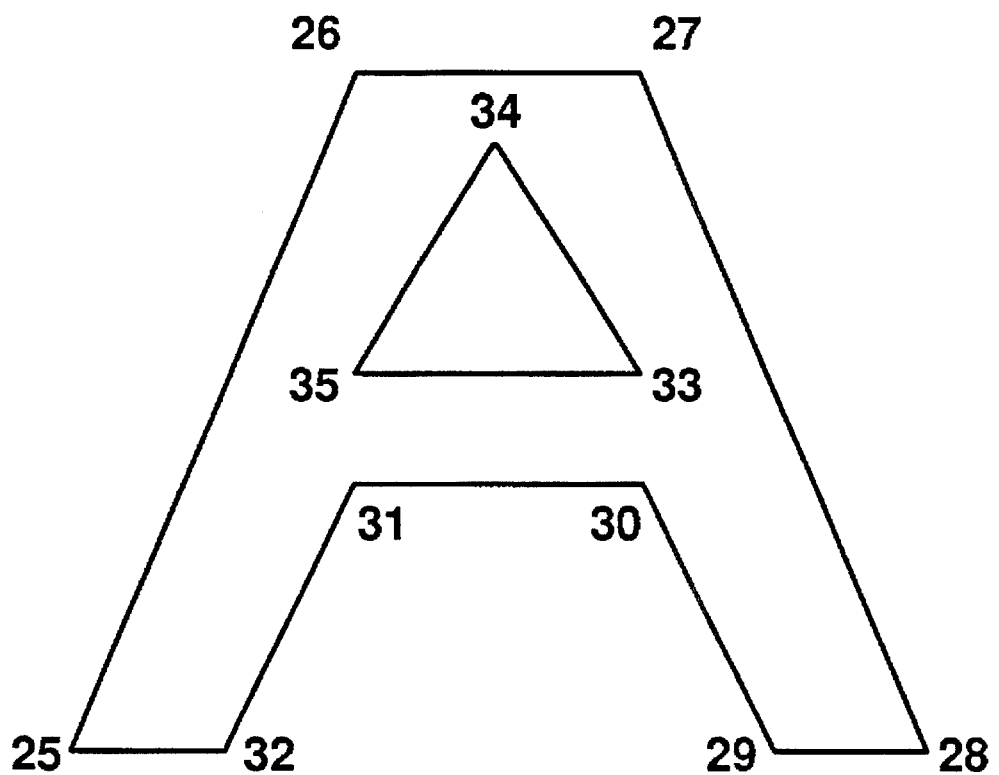
FIG. 3b illustrates B-spline outlines of a character "A" with its control points.

The first starting point is expressed in terms of absolute x and y-coordinates, and is by definition always point 0 (zero). For all following outlines, the starting point is the ending point of the last outline plus one. Applying the above format to our example in FIG. 3*b*, we would have the following data structure:

| Characteristics | Number | Description |
|---|---|---|
| Number of outlines | 2 | The outside of letter A and inside of the same. |
| Bounding Box | x-min; y-min x-max; y-max | The four corners of a box bounding a glyph. |
| Ending points of | 32, 35 | The outline for the outside goes from 25–32 and the inside from 33–35 |
| # of bytes for instructions | n | This length specifies how many bytes are for instructions. |
| Instructions | n bytes | location of actual instructions to control a glyph. |
| List of flags | 24 flags for 24 points |  |
| x-coordinates | 48 bytes for 24 | Size smaller if compact |

| Characteristics | Number | Description |
| --- | --- | --- |
| | points | method with flags is used. |
| y-coordinates | 48 bytes for 24 points | Size smaller if compact method with flags is used. |

Figure 4:
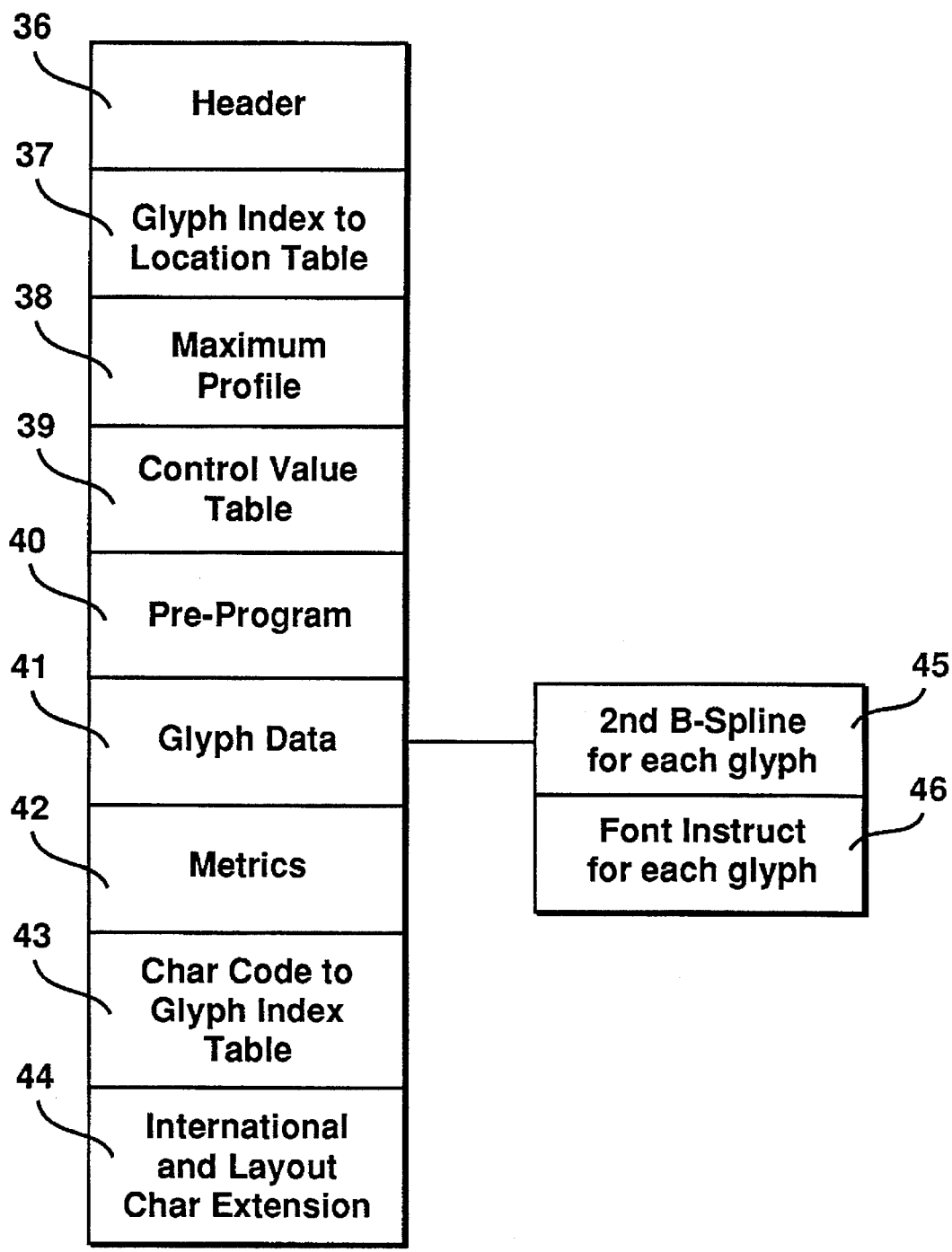
FIG. 4 illustrates a typical B-spline outline data structure for storing a font.

FIG. 4 illustrates a possible data structure for an outline font as a family of related glyphs is described and stored in the font resource. Of particular interest to the user are a Control Value Table 39 and a Pre-Program 40. The Control Value Table 39 comprises of a set of figures that can be used to set uniform sizes for different glyph or character elements. For instance, the following information may be stored:

Capital height (for rounded characters and flat ones)

x-height ascender height (for rounded characters and flat ones)

descender height (for rounded characters and flat ones)

figure height overlaps (example: how much taller is a capital "O" than a capital "H")

width of character stems, etc.

The contents of the Control Value Table 39 correspond to the basic units of measurement in the field of digital typography. X-height is the basic height of the lowercase letters "x", while ascender is that parts of the lowercase letters that reach above the x-height and descender is that parts that fall below the baseline. As such, instructions using values from the Control Value Table 39 can scale glyphs to the appropriate point size.

In FIG. 4, the Pre-Program 40 is a collection of instructions that modify the Control Value Table 39 within the outline font. Whenever the user selects a new font or a new size in the same font, the Pre-Program 40 is executed to modify the values in the Control Value Table 39. Similarly, the Pre-Program 40 sets up the Graphic State of the interpreter before the user begins working with the new font or size. The Graphic State is divided into a local and global state. The local Graphic State does not have any inter-glyph memory, so it is fresh for each glyph. In contrast, the global Graphic State has inter-glyph memory and also stays in effect between the Pre-Program 40 and the glyph.

FIG. 5 shows an interpreter 51 and scan converter 52. The input to the interpreter consists of the control points that make up a glyph, information describing the beginning and the end of the outlines, Pre-Program 40, font instructions 50, and the Control Value Table 39. The interpreter 51 has a Graphic State which defines the context in which any of the font instructions operate. Through the use of font instructions; the grid-fitting of a glyph, regularization of text, and other operations upon the font are accomplished. The user can sequence the font instructions in any order, giving him a high degree of flexibility in controlling the font. The following is a synopsis of the various broad categories of font instructions 50 among which users can select in rendering digital fonts:

| Function of Routines | # of Routines |
| --- | --- |
| Adjust Angle | 1 |
| Freedom and Projection Vectors | 10 |
| Internal and Character Element Pointers | 7 |
| Modifying Internal Settings | 14 |
| Stack Manipulation | 7 |
| Interpolation and Shift Instructions | 7 |
| Moving Points | 8 |
| Reading and Writing Data | 11 |
| Relational and Logical Instructions | 11 |
| IF-Statements Instructions | 2 |
| Arithmetic and Math Instructions | 10 |
| Short Push Instructions | 2 |
| Function Calls | 4 |
| Delta Exceptions | 3 |
| Reading and Writing Metrics | 3 |
| Debugging Instructions | 1 |

The repertoire of font instructions coupled with the flexible approach to grid-fitting give users the freedom to render and to improve upon digital typefaces at low raster resolutions. In particular, the adjust angle instruction automatically determines the optimum angle for displaying a line for raster output devices.

APPLICATION OF THE PREFERRED EMBODIMENT

Having described in detail the general system configuration, the process and the terminology of accepting the input of font outlines, the applicant will now apply the inventive method to determine the optimum angle for displaying a line as shown in FIG. 6 through FIG. 12. It should be understood that a line is not restricted to the shortest distance between two given points, but also includes symbols such as "/", the left edge of the character "A", and any glyph which has a straight edge portion which is at an angle other than the vertical or the horizontal.

In FIG. 6a, a horizontal line AB is about to be displayed at a raster resolution. Like most commercially available fonts on which the present invention applies, the line AB is designed at a high raster resolution. As a result, the line AB would look its best if it were displayed at or close to the resolution at which it was created. However, as in the special case of a horizontal line or a vertical line, such as the line AB, the resulting bitmap does not differ significantly from the original glyph as shown in the adjoining dotted pixels in FIG. 6b. A possible basis for measuring how the quality of the line AB changes as it is displayed at a low raster resolution is the pixel pattern which is repeated in the bitmap in FIG. 6b, and is illustrated in FIG. 6c.

In FIG. 7a, a line CD or the symbol "/" is about to be displayed at a raster resolution. It is presumed that the line CD was also created originally as part of a family of fonts at a higher raster resolution. The line CD is superimposed on a step-wise series of pixels. The pixels represent a resulting bitmap of a raster output device. At higher resolution the line CD appears smooth. However, at a raster resolution, the line CD appears to be a jagged line such as that shown in FIG. 7b. The pixel pattern as shown in dotted rectangle in FIG. 7c is repeated at an angle to construct the bitmap for displaying the line CD on raster output devices.

In FIG. 8a, a line EF at a slightly different angle is about to be displayed at a raster resolution. It is also presumed that the line EF was originally created as part of a family of fonts at a higher raster resolution. Just as in FIG. 7a, the line EF in FIG. 8a is superimposed on a step-wise series of pixels. Like the partial bitmap in FIG. 7b, the partial bitmap in FIG. 8b shows a jugged representation of the straight line EF. However, in FIG. 8c the pixel pattern is larger and longer than that in either FIG. 6c or FIG. 7c.

Figure 9A:
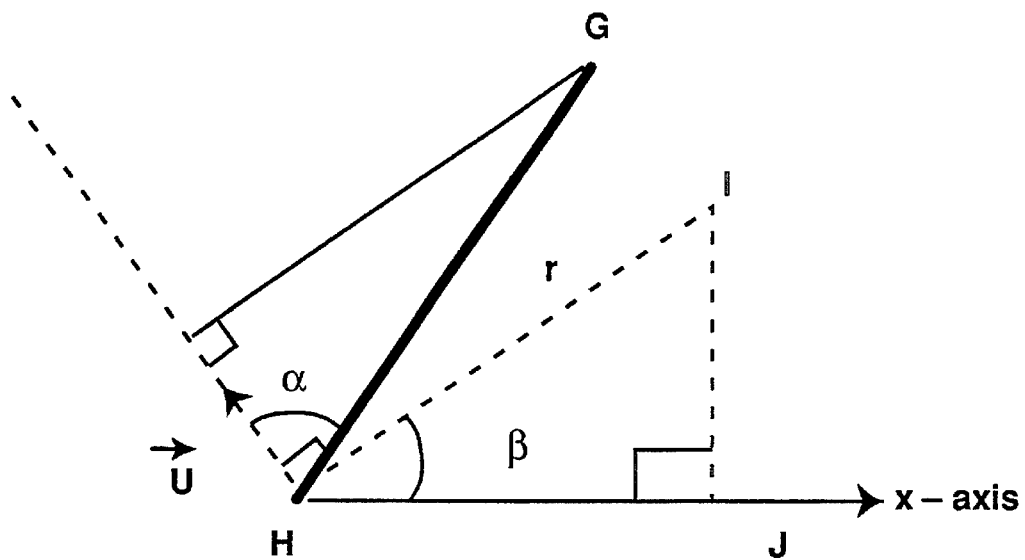
FIG. 9a is a distance variable used in the preferred embodiment of the present invention to determine the optimum angle for displaying a line on raster output devices.

The repetition of the pixel pattern in the resulting bitmap at low raster resolution lends itself to a method of determining the optimum angle for displaying a line. From FIGS. 6, 7 and 8, it can be observed that the shorter the repetition of a pixel pattern, the better the line will appear in the resulting bitmap. To capture the possible changes of a line as it is being displayed on a raster output device, the preferred embodiment of the present invention uses the pixel repetition period as a distance variable, r. In FIG. 9a, a line GH is superimposed on a two dimensional curvilinear coordinate plane. The line GH is about to be displayed from a high raster resolution to a low raster resolution. A dotted line HI is one possible pixel repetition period at whose angle the line GH may be adjusted to be displayed. The dotted line HI is at an angle β with the x-axis. It follows from FIG. 7c and FIG. 8c that the dotted lines IJ and HJ are integers of pixels units. An unit vector u is provided, and is perpendicular to the dotted line HI. The unit vector u is also at an angle α with the line GH. It should be apparent to one skilled in the art that the line HI represents a plurality of pixel repetition period as the angle β is rotated between the vertical (y-axis) and horizontal (x-axis) angles. Similarly, the determination of the optimum angle may be based on any space or coordinate systems. The distance variable r is related to the angle β by the equation 54 in FIG. 9a.

Figure 9B:
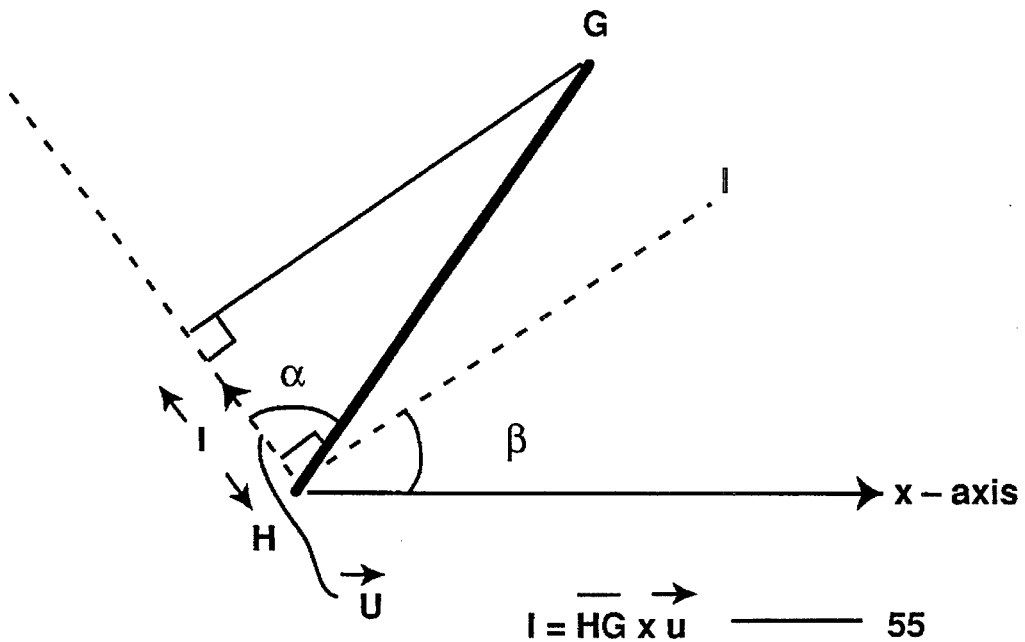
FIG. 9b defines a angular variable used in the preferred embodiment of the present invention to determine the optimum angle for displaying a line on raster output devices.

In FIG. 9b, the preferred embodiment of the present invention defines an angular variable, 1. The angular variable is a projection of the point E along the line parallel to the unit vector u. The angular variable 1 measures the change in angle as the line GH is adjusted by the angle β from the x-axis.

To account for all the possible change in distance and in angle when a line is displayed from a high raster resolution to a low raster resolution, the preferred embodiment of the present invention seeks to minimize a penalty which is the weighted sum of the the distance variable and the angular variable, and is illustrated as follows:

$$\text{Penalty} = \text{distance variable} + \text{constant} * \text{angular variable}$$
$$= r + C*1$$

The constant C allows the user to adjust the relative importance of the distance variable and the angular variable. For some, the speed of displaying a line is more important, while others prefer the quality of the line displayed. To determine the optimum angle for displaying a line on raster output devices, the present invention minimizes the penalty. Because the method to determine the optimum angle for displaying a line on raster output devices is but one of a host of other font instructions in a typical program to grit-fit a family of fonts, the method must reach its optimal solution quickly and automatically.

Figure 10A:
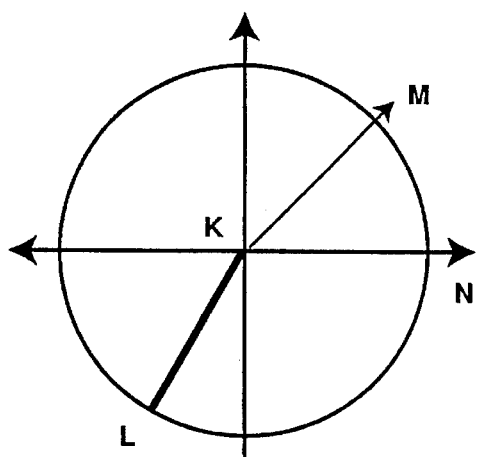
FIG. 10a shows a line KL being positioned in the third quadrant.
Figure 10B:
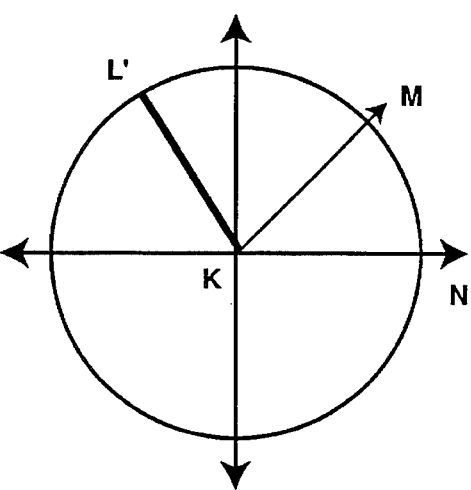
FIG. 10b shows the line KL is mapped to line KL' in the second quadrant.
Figure 10C:
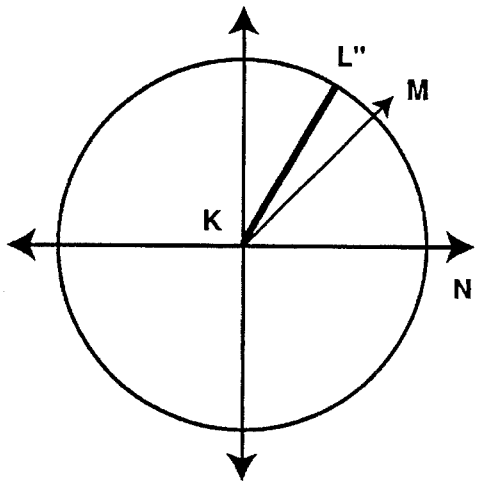
FIG. 10c shows the line KL' is mapped to line KL" in the second octant.
Figure 10D:
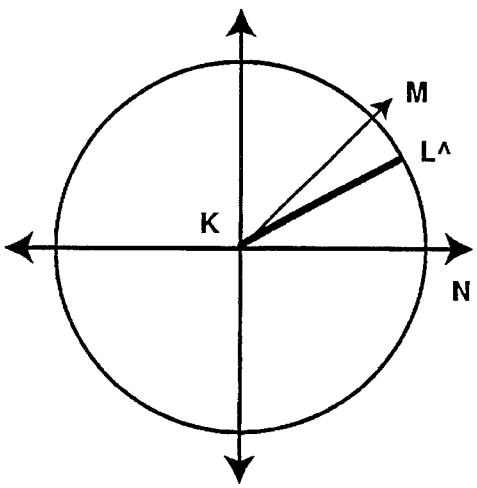
FIG. 10d shows the line KL" is mapped to line KL^ in the first octant MKN.
Figure 10E:
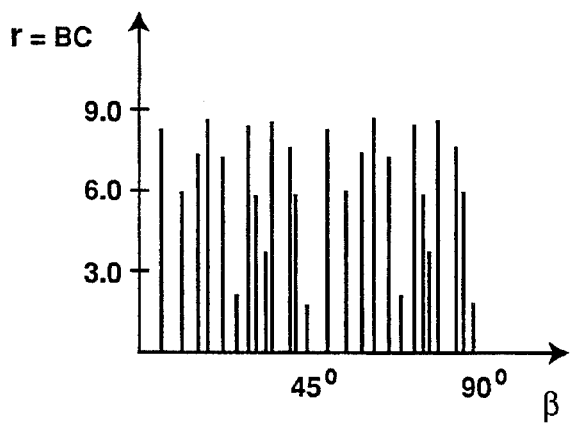
FIG. 10e shows a possible number of distance adjustments in pixel repetition units as line HI is rotated through angle β.

Two observations related to the resulting bitmap at low raster resolution suggest means to narrow the scope of the search for the optimum angle for displaying a line. Firstly, the resulting bitmap comprises of discrete pixels units. As such, any distance variable r is governed by the equation 54 in FIG. 9a. Secondly, the number of angle β can be substantially reduced since any line outside of the first octant may be mapped onto it for operation and subsequently remapped to its original octant. In FIG. 10a, a line KL is in the third quadrant. The first octant is defined by MKN. It follows in FIG. 10b, the line KL is mapped to fourth quadrant as a line KL'. In FIG. 10c, the line KL" is mapped to the second octant of the first quadrant. Finally, in FIG. 10d, the line KL" is mapped onto the first octant as a line KL^. It is understood that a variety of mapping techniques may be used to reduce the number of angles. FIG. 10e is a graph of the relationship between the distance variable r and the angular variable 1. The angular variable is in turn dependent on the angle β. Shown in FIG. 10e is a representative sample of the large variation in values of the distance variable as the angle β goes from 0 to 45 degrees and repeats themselves from 45 to 90 degrees. Based on current display technology, one should not consider distance variable that are greater than 9 pixels as the penalty becomes larger.

The process of narrowing the scope of search for the optimum angle for displaying a line at low raster resolution produces a table of twenty angles as shown in FIG. 11. The table consists of pre-sorted values of 20 distance variables and corresponding angular variables which takes into account the optimization factors discussed in the preceding paragraph. The distance variable, r, is arranged in ascending order. The x and y coordinates of the respective unit vector U for each distance variable are also conveniently calculated. On the left most column is a counting variable i which enables a graphic display system to quickly determine if an optimum angle for displaying a line can be found.

Figure 12:
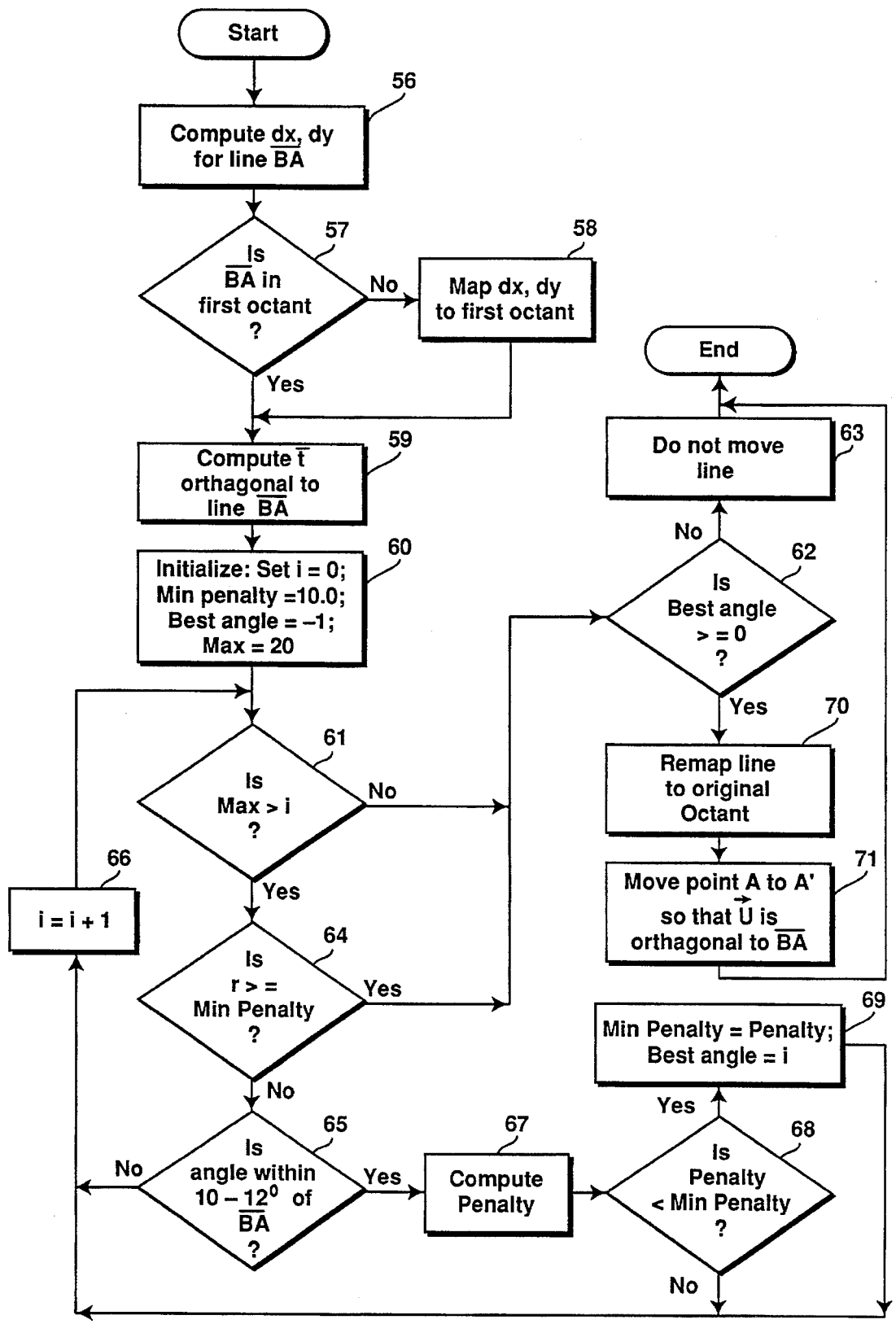
FIG. 12 is a flow chart showing the preferred embodiment of the present invention in determining the optimum angle for displaying a line at on raster output devices.

FIG. 12 is a flow chart showing the preferred embodiment of the present invention as implemented on a digital graphic display system. A line BA is presumed given, and the present invention is to determined if in displaying at a low raster resolution whether it should be adjusted to another position BA' or accept the resulting bitmap generated by the digital graphic display system.

In step 56, the x and y displacement of a given line BA is determined. In step 57, the inventive method queries if the line is in the first octant. If not, the line BA undergoes a mapping process similar to that described earlier in FIG. 10a–d and noted in step 58. Once the line BA is mapped onto the first octant, a unit vector t perpendicular to the line BA is determined in step 59. The unit vector t is used later to determine if the angular variable under consideration is too far off the line BA. Step 60 begins the initialization process of determining the optimum angle for displaying a line by setting a counting variable i=1; a minimum penalty=10.0; a best angle =−1; and a Max=20. As described in FIG. 11, the i is a counting variable for indicating to the user if all 20 presorted angles in the table have been considered. The minimum penalty is an upper limit for the distance variable r. The best angle is for signalling to the angle optimizing process which among the angles examined is the best thus far. In step 61, the Max is compared to i, which has values between 0 and 19 as illustrated in table in FIG. 11. If Max is greater than i, it means that not all twenty angles have been compared. However, if Max is less than i, the inventive method proceeds to step 62 where best angle is checked if it is greater than or equal to 0. Should the best angle be less than 0, then no improvement over the line BA exists as noted in step 63. However, if the best angle is greater than or equal to 0, then the line BA should be remapped to its original octant as shown in step 70. It should be understood that the remapping process in step 70 is just the reverse of the mapping steps as shown in FIG. 10 a–d. Finally the point A should be moved to A' on line BA' such that the unit vector U is perpendicular to the line BA' as in step 71.

Returning to step 64, the distance variable r is compared with the minimum penalty. If the distance variable is smaller than 10 pixels, it should proceeds to step 62 which was explained above. Otherwise, the angle β should be checked to determined if it is within 10 to 12 degrees of the line BA. This is accomplished by comparing the the angle between the unit vector t and the unit vector U. If the angular variable is not within the 10–12 degree range, the counting variable i is incremented in step 66, and check the next pre-sorted angle β in the table in FIG. 11. The 10–12 degree criteria is selected because it is observed that adjustment farther away from the original line tends to generate worse resulting bitmap than those that are closer. Moreover, angles outside of the 10–12 degree range also tend to produce higher penalty. If the angle β is within the 10–12 degree range, the penalty is computed in step 67. Next, in step 68 the computed penalty is compared with the minimum penalty. If the computed penalty is less than the minimum penalty, the minimum penalty is set equal to the computed penalty. If the computed penalty is more than the minimum penalty, the computed penalty remains unchanged. In both cases, the counting variable i will be incremented so that the next bigger angular β may be used to computed a new penalty.

While the present invention has been particularly described with reference to FIGS. 1–12 and with emphasis on certain choices of splines, variables and look-up table in determining the optimum angle for displaying a line, it should be understood that they are for illustration only and should not be taken as limitation upon the invention. In addition, it is clear that the method of the present invention has utility in any application which graphic representations on a display device are desired. It is contemplated that many changes and modifications may be made, by one skilled in the art, without departing from the spirit and scope of the invention as disclosed above.

What is claimed is:

1. In a computer system, comprising a memory means, a processing means, and a raster scanned graphic output device, a method for controlling said raster scanned graphic output device having an array of pixels controlled by electronic signals which are transmitted to said output device in said system in order to display a line at an improved angle at various raster resolutions, said method comprising the steps of:

storing in said memory means a first plurality of electronic signals representing control points specifying at least one outline of said line;

said processing means selecting at least one of said control points of said at least one outline for manipulation;

said processing means relating a penalty with a weighted sum of an angular variable and a corresponding distance variable;

said processing means minimizing said penalty for determining said angle on said raster scanned graphic output device; and displaying a plurality of pixels representing said line at said angle on said raster scanned graphic output device by transmitting a second plurality of electronic signals for said plurality of pixels to said output device, each of said second plurality of electronic signals having a value which specifies the intensity of said pixel corresponding with each of said second plurality of electronic signals.

2. The method as defined by claim 1, wherein said line comprises a glyph having at least a straight edge portion.

3. The method as defined in claim 1, wherein said weighted sum comprises a distance variable, said distance variable representing a plurality of linear projections that said line may assume.

4. The method as defined in claim 3, wherein said linear projection further comprises a plurality of pixel repetition periods, said pixel repetition period falling within an octant, said octant having one end point of said line as its center.

5. The method as defined in claim 4, wherein said distance variables may be mapped from one octant to another, said octant being descriptive of the position of said line in a coordinate plane.

6. The method as defined in claim 1, wherein said weighted sum further comprises of an angular variable, said angular variable measuring the possible angular changes in said line.

7. The method as defined in claim 6, wherein said angular variable further comprise a plurality of angular projections.

8. The method as defined in claim 7, wherein said angular variable further comprises a vector product of said line and an unit vector perpendicular to a pixel repetition period.

9. The method as defined in claim 1, wherein said penalty is said weighted sum of said distance variable and said angular variable.

10. The method as defined in claim 1, wherein said penalty is constrained by a predetermined number of pixels, said predetermined number of pixels being a minimum penalty.

11. The method as defined in claim 1, wherein a comparison between said penalty and a minimum penalty determines the optimum angle for displaying said line at low raster resolution if said penalty is less than said minimum penalty, said distance variable is greater than said minimum penalty, and said angle is within a predetermined range of said line.

12. The method as defined in claim 1, wherein a comparison between said penalty and a minimum penalty determines that said line requires no adjustment for displaying said line at low raster resolution if said penalty is greater than said minimum penalty, said distance variable is less than said minimum penalty, and said angle is more than twelve degrees outside of said line.

13. In a computer system, a method of controlling a raster scanned graphic output device having an array of pixels controlled by electronic signals which are transmitted to said output device in said system in order to display a line at an improved angle at various raster resolutions, which line is a portion of a glyph, said method comprising:

storing in a memory means a first plurality of electronic signals representing control points specifying outlines of said line with a first angle with respect to a first axis;

executing an instruction to modify said first angle of said line, said step of executing causing certain of said control points to be selected for manipulation;

determining an improved angle for display of said line on said raster scanned graphic output device for finding a second angle at which said line has a minimal pixel repetition period;

manipulating the location of said certain of said control points to adjust said line to have said improved angle on said raster scanned graphic output device;

displaying a plurality of pixels representing said line at said improved angle on said raster scanned graphic output device by transmitting a plurality of second electronic signals representing said plurality of pixels to said output device, each of said second plurality of electronic signals having a value which specifies the intensity of said pixel corresponding with each of said second plurality of electronic signals.

14. A method as in claim 13 wherein said method further comprises the step of scan converting said line having an improved angle.

15. In a computer system, a method for controlling a raster scanned graphic output device having an array of pixels controlled by electronic signals which are transmitted to said output device in said system in order to display a line at an improved angle at various raster resolutions, which line is a portion of a glyph, said method comprising:

storing in memory means a plurality of electronic signals representing control points specifying said line with a first angle with respect to a first axis;

executing an instruction to modify said first angle of said line, said step of executing causing certain of said control points to be selected for manipulation;

determining an improved angle to be used for display on said raster scanned graphic output device by finding a second angle at which a weighted sum of an angular variable and a corresponding distance variable is minimized;

manipulating the location of said certain of said control points to adjust said line to have said improved angle on said raster scanned graphic output device, said improved angle being said second angle;

displaying a plurality of pixels by transmitting a plurality of second electronic signals to said output device, said plurality of second electronic signals representing said line at said improved angle on said raster scanned graphic output device.

16. A method as in claim 15 further comprising the step of selecting a constant with specifies the relative importance of said distance variable and said angular variable.

17. In a computer system, an apparatus for controlling a raster scanned graphic output device having an array of pixels in order to display a line at an improved angle at various raster resolutions on said raster scanned graphic output device comprising:

memory means for storing a first plurality of electronic signals representing a first plurality of control points specifying outline of said line;

selection means for selecting at least one of said first plurality of control points of said outlines for manipulation;

relation means for relating a penalty with a weighted sum of an angular variable and a corresponding distance variable for said at least one of said first plurality of control points;

minimization means for minimizing said penalty for determining said angle on said raster scanned graphic output device; and display means for receiving a second plurality of electronic signals from said minimization means and displaying a plurality of pixels representing said line at said angle on said raster scanned graphic output device due to said second plurality of electronic signals.

18. The apparatus as defined by claim 17, wherein said line comprises a glyph having at least a straight edge portion.

19. The apparatus as defined in claim 17, wherein said weighted sum comprises a distance variable, said distance variable representing a plurality of linear projections that said line may assume.

20. The apparatus as defined in claim 19, wherein said linear projection further comprises a plurality of pixel repetition periods, said pixel repetition periods falling within an octant, said octant having one end point of said line as its center.

21. The apparatus as defined in claim 20, wherein said distance variables may be mapped from one octant to another, said octant being descriptive of the position of said line in a coordinate plane.

22. The apparatus as defined in claim 17, wherein said weighted sum further comprises an angular variable, said angular variable measuring the possible angular changes in said line.

23. The apparatus as defined in claim 22, wherein said angular variable further comprises a plurality of angular projections.

24. The apparatus as defined in claim 23, wherein said angular variable further comprises a vector product of said line and a unit vector perpendicular to a pixel repetition period.

25. The apparatus as defined in claim 17, wherein said penalty is said weighted sum of said distance variable and said angular variable.

26. The apparatus as defined in claim 17, wherein said penalty is constrained by a predetermined number of pixels, said predetermined number of pixels being a minimum penalty.

27. The apparatus as defined in claim 17, wherein a comparison means determines a comparison between said penalty and a minimum penalty for determining the optimum angle for displaying said line at low raster resolution if said penalty is less than said minimum penalty, said distance variable is greater than said minimum penalty, and said angle is within a predetermined range of said line.

28. The apparatus as defined in claim 17, wherein a comparison means determines a comparison between said penalty and a minimum penalty for determining that said line requires no adjustment for displaying said line at low raster resolution if said penalty is greater than said minimum penalty, said distance variable is less than said minimum penalty, and said angle is more than twelve degrees outside of said line.

29. In a computer system, an apparatus for controlling a raster scanned graphic output device having an array of pixels, each of said array of pixels generated by electronic signals in order to display a line at an improved angle at various raster resolutions, which line is a portion of a glyph, comprising:

storage means for storing a first plurality of electronic signals in a memory means representing a first plurality of control points specifying outlines of said line with a first angle with respect to a first axis;

instruction execution means for executing an instruction to modify said first angle of said line, said executing causing certain of said control points to be selected for manipulation;

improved angle determination means for finding a second angle at which said line has a minimal pixel repetition period on said raster scanned graphic output device;

location manipulation means for manipulating the location of said certain of said control points to adjust said line to have said improved angle on said raster scanned graphic output device;

display means for receiving a second plurality of electronic signals and displaying a plurality of pixels due to said second plurality of electronic signals for representing said line at said improved angle on said raster scanned graphic output device.

30. The apparatus of claim 29 wherein said apparatus further comprises scan conversion means for converting said line having said improved angle.

31. In a computer system, an apparatus for controlling a raster scanned graphic output device having an array of pixels controlled by electronic signals in order to display a line at an improved angle at various raster resolutions, which line is a portion of a glyph, comprising:

memory means for storing a plurality of first electronic signals representing a first plurality of control points specifying said line with a first angle with respect to a first axis;

instruction execution means for modifying said first angle of said line, said means causing certain of said control points to be selected for manipulation;

improved angle determination means for finding a second angle at which a weighted sum of an angular variable and a corresponding distance variable is minimized on said raster scanned graphic output device;

location manipulation means for moving said certain of said control points to adjust said line to have said second angle;

display means for receiving a second plurality of electronic signals and displaying a plurality of pixels due to said second plurality of electronic signals for representing said line at said second angle on said output device.

32. The apparatus of claim 31 further comprising means for selecting a constant which specifies the relative importance of said distance variable and said angular variable.

33. In a computer system comprising a memory, a processor, and a raster scanned graphic output device, a method for controlling said raster scanned graphic output device having an array of pixels controlled by electronic signals which are transmitted to said output device in said system in order to display a line at an improved angle at various raster resolutions, said method comprising the steps of:

storing in said memory a first plurality of electronic signals representing control points specifying at least one outline of said line;

said processor selecting at least one of said control points of said at least one outline for manipulation;

said processor relating a penalty with a weighted sum of an angular variable and a corresponding distance variable;

said processor minimizing said penalty for determining said angle on said raster scanned graphic output device; and displaying a plurality of pixels representing said line at said angle on said raster scanned graphic output device by transmitting a second plurality of electronic signals for said plurality of pixels to said output device, each of said second plurality of electronic signals having a value which specifies the intensity of said pixel corresponding with each of said second plurality of electronic signals.

34. The method as defined by claim 33, wherein said line comprises a glyph having at least one straight edge portion.

35. The method as defined in claim 33, wherein said weighted sum comprises a distance variable, said distance variable representing a plurality of linear projections that said line may assume.

36. The method as defined in claim 35, wherein said linear projection further comprises a plurality of pixel repetition periods, said pixel repetition periods falling within an octant, said octant having one end point of said line as its center.

37. The method as defined in claim 36, wherein said distance variables may be mapped from one octant to another, said octant being descriptive of the position of said line in a coordinate plane.

38. The method as defined in claim 33, wherein said weighted sum further comprises an angular variable, said angular variable measuring the possible angular changes in said line.

39. The method as defined in claim 38, wherein said angular variable further comprise a plurality of angular projections.

40. The method as defined in claim 39, wherein said angular variable further comprises a vector product of said line and an unit vector perpendicular to a pixel repetition period.

41. The method as defined in claim 33, wherein said penalty comprises said weighted sum of said distance variable and said angular variable.

42. The method as defined in claim 33, wherein said penalty is constrained by a predetermined number of pixels, said predetermined number of pixels being a minimum penalty.

43. The method as defined in claim 33, wherein a comparison between said penalty and a minimum penalty determines the optimum angle for displaying said line at low raster resolution if said penalty is less than said minimum penalty, said distance variable is greater than said minimum penalty, and said angle is within a predetermined range of said line.

44. The method as defined in claim 33, wherein a comparison between said penalty and a minimum penalty determines that said line requires no adjustment for displaying said line at low raster resolution if said penalty is greater than said minimum penalty, said distance variable is less than said minimum penalty, and said angle is more than twelve degrees outside of said line.

45. An apparatus for controlling a raster scanned graphic output device having an array of pixels in order to display a line at an improved angle at various raster resolutions on said raster scanned graphic output device comprising:

a memory for storing a first plurality of electronic signals representing a first plurality of control points specifying outlines of said line;

a selection circuit for selecting at least one of said first plurality of control points of said outlines for manipulation;

a relation circuit for relating a penalty with a weighted sum of an angular variable and a corresponding distance variable for said at least one of said first plurality of control points;

a minimization circuit for minimizing said penalty for determining said angle on said raster scanned graphic output device; and a display circuit for receiving a second plurality of electronic signals from said minimization circuit and displaying a plurality of pixels representing said line at said angle on said raster scanned graphic output device due to said second plurality of electronic signals.

46. An apparatus comprising:

a. a raster scanned graphic output device having an array of pixels controlled by electronic signals;

b. a memory coupled to said raster scanned graphic output device for providing said electronic signals; and c. a processor coupled to said memory, said processor controlling said raster scanned graphic output device by storing said electronic signals in said memory in order to display a line at an improved angle at various raster resolutions, said processor storing in said memory a first plurality of electronic signals representing control points specifying at least one outline of said line, selecting at least one of said control points of said at least one outline for manipulation, relating a penalty with a weighted sum of an angular variable and a corresponding distance variable, minimizing said penalty for determining said angle on said raster scanned graphic output device and storing a second set of electronic signals in said memory representing said line at said angle on said raster scanned graphic output device, each of said second plurality of electronic signals having a value which specifies the intensity of said pixel corresponding with each of said second plurality of electronic signals.

* * * * *